United States Patent
Curlett

[11] 4,081,009
[45] Mar. 28, 1978

[54] METHOD AND APPARATUS FOR SEVERING FIBROUS ARTICLES SUCH AS TREES

[75] Inventor: John Curlett, Los Gatos, Calif.

[73] Assignee: FMC Corporation, San Jose, Calif.

[21] Appl. No.: 734,856

[22] Filed: Oct. 22, 1976

[51] Int. Cl.² .............................................. A01G 23/08
[52] U.S. Cl. .............................. 144/309 AC; 83/830; 83/928; 144/34 R; 144/34 E; 299/82
[58] Field of Search ................ 83/830, 831, 832, 833, 83/834, 928; 144/2 Z, 3 D, 34 R, 34 E, 309 AC; 74/250; 299/82, 83, 84

[56] References Cited

U.S. PATENT DOCUMENTS

| | | | |
|---|---|---|---|
| 2,601,978 | 7/1952 | Simmons | 299/82 |
| 2,806,683 | 9/1957 | Russell | 299/82 X |
| 3,854,510 | 12/1974 | Matlik | 144/3 D X |
| 3,996,981 | 12/1976 | Bruun | 144/34 R |

FOREIGN PATENT DOCUMENTS 330,602  11/1970  Sweden ..................... 144/34 R Primary Examiner—Donald R. Schran
Assistant Examiner—W. D. Bray
Attorney, Agent, or Firm—A. J. Moore

[57] ABSTRACT

A tree cutting method and apparatus includes at least one shear blade having its tree contacting edge recessed to define a pair of spaced shearing edges with a fiber receiving groove therebetween. A fiber removing device is recessed within the groove out of contact with the solid wood of the tree and is preferably in the form of a driven endless fiber removing chain. As pressure is applied by the spaced shearing edges of shear projections of the blade against the tree, the fiber removing device removes the fibers that are fed into the groove. The removal of fibers greatly reduces the transverse force required by the shear blade to penetrate the tree or bole, and further reduces the resulting longitudinal shearing forces applied to the tree due to the longitudinal compression as the blade moves transversely through the tree thereby minimizing longitudinal splitting of the bole. The partially crushed fibers require less force than a saw cutting through solid wood to remove the wood from the tree during the severing operation.

27 Claims, 11 Drawing Figures

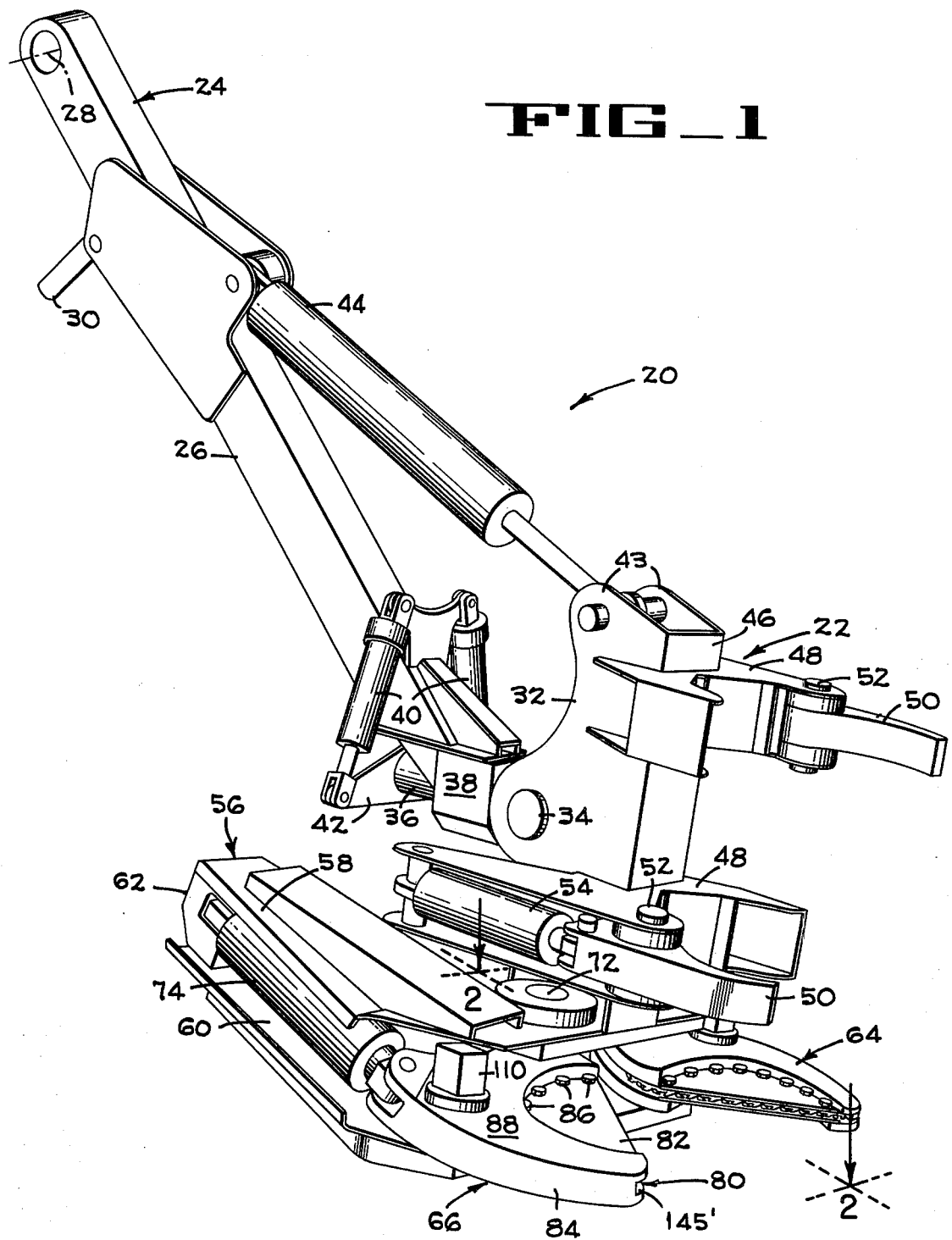
FIG_1

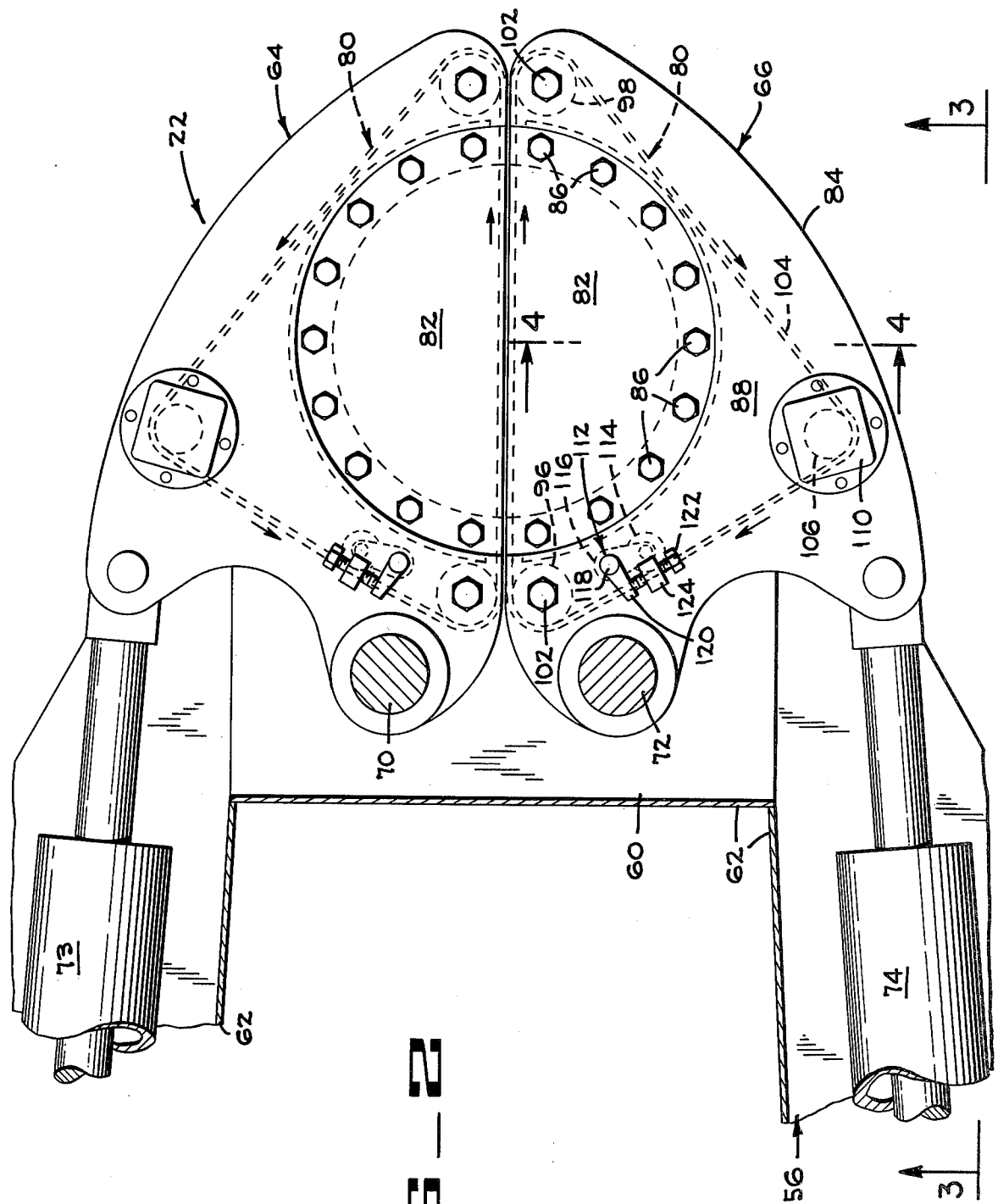

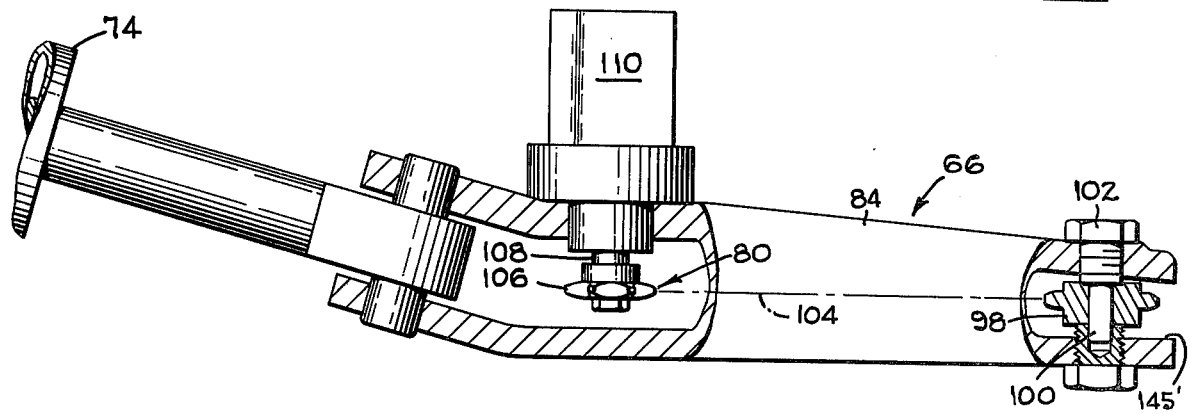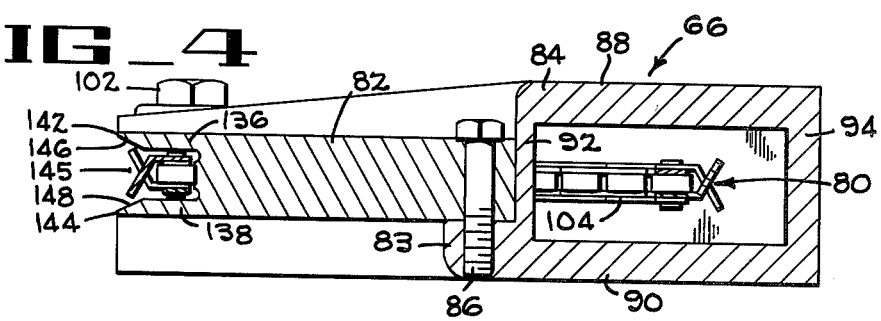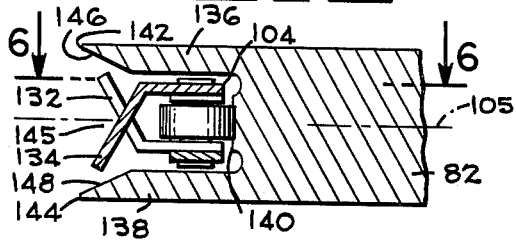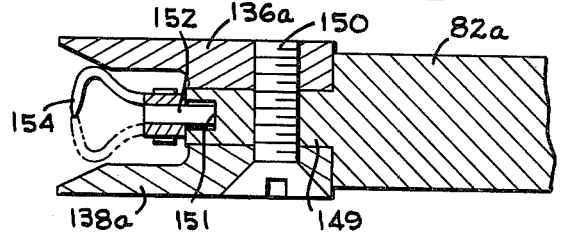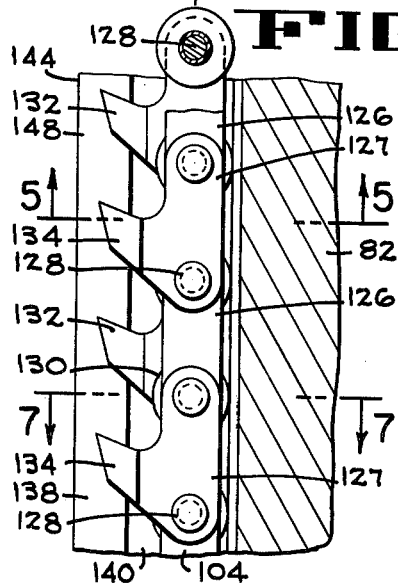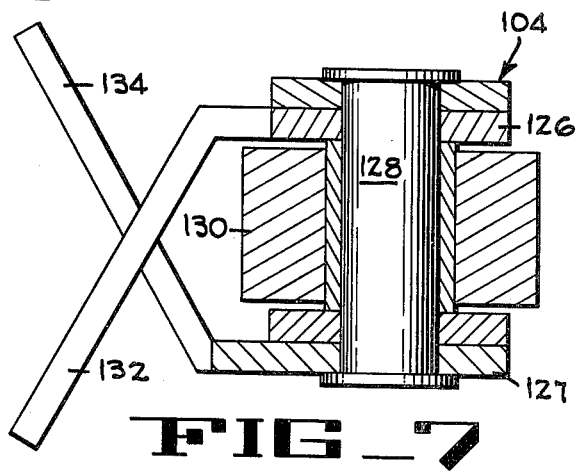

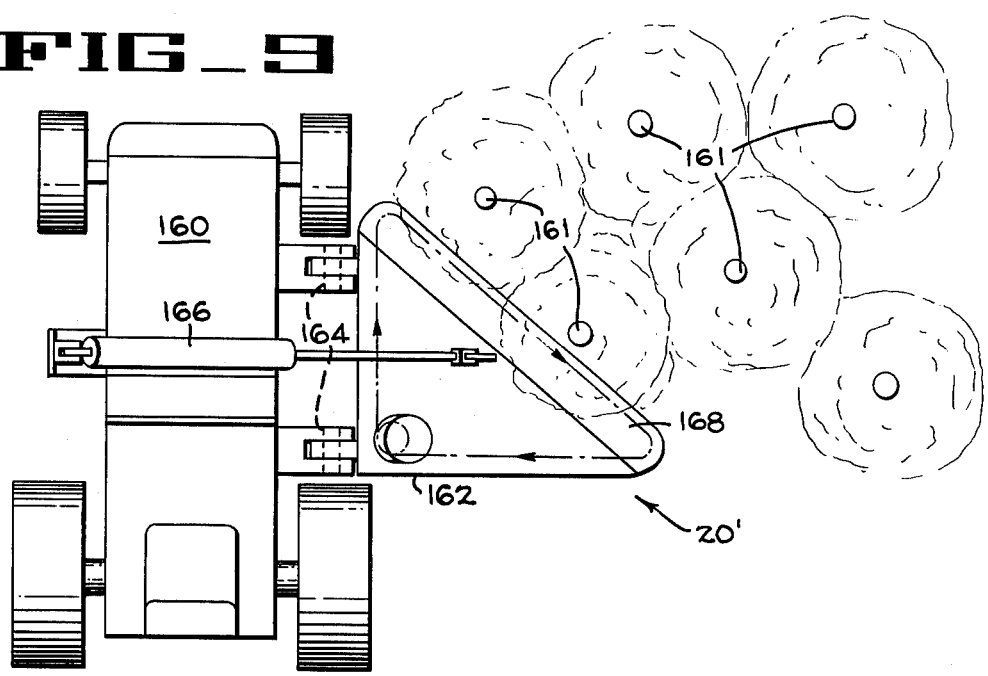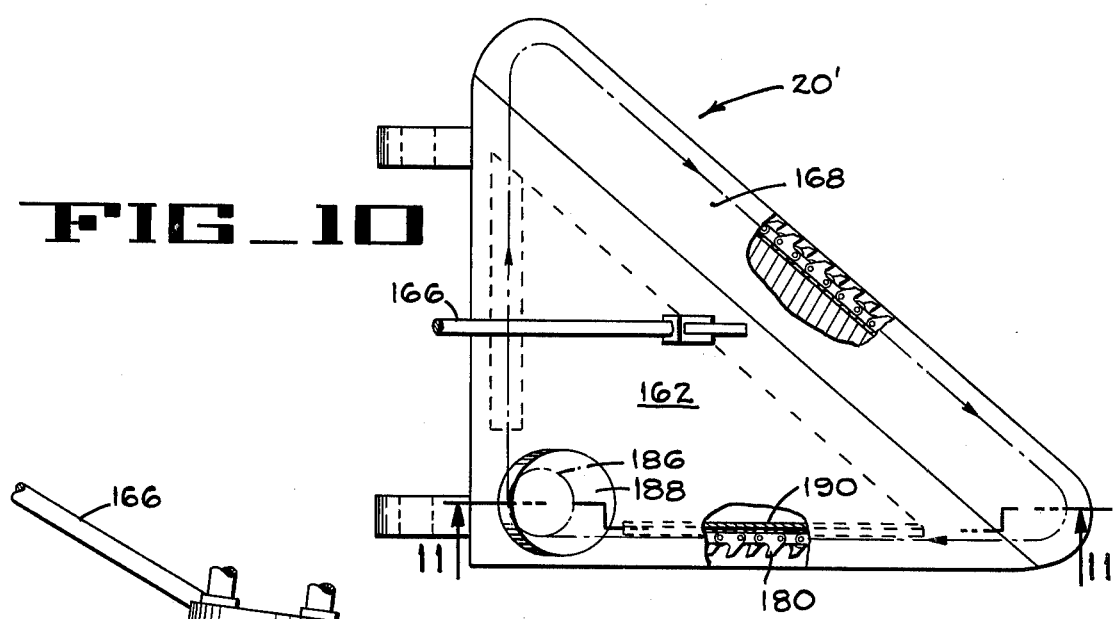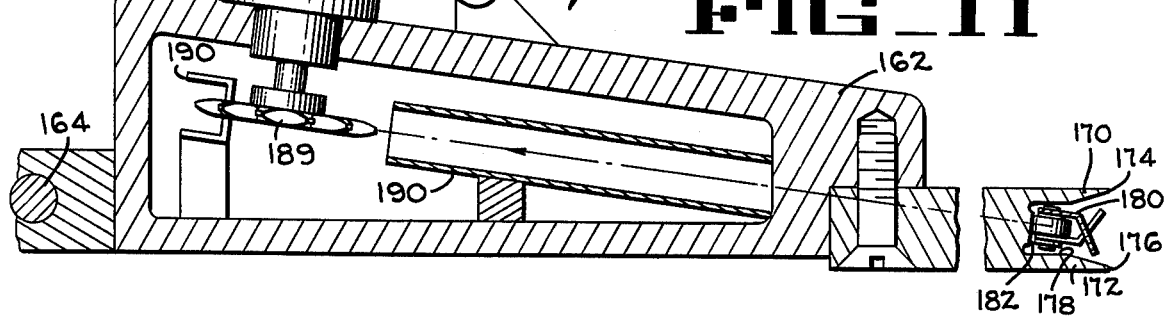

METHOD AND APPARATUS FOR SEVERING FIBROUS ARTICLES SUCH AS TREES

BACKGROUND OF THE INVENTION

1. Field of the Invention

This invention relates to severing devices for fibrous material, and more particularly relates to a combination shear-saw used for felling or otherwise cutting through the bole of a tree.

2. Description of the Prior Art

It is well known in the tree cutting art that felling or bole slashing shears cause high longitudinal compressive forces in the tree as the shear blade progresses transversely through the wood resulting in severe wood splitting. Increasing demands by government and industry to extract all good saw timber from felled trees, including the large diameter portions of almost all pulpwood, requires that care be taken to minimize splitting of trees when they are felled. Although shears are the fastest and most durable means of felling trees, the tree splitting problem is so great that industry is looking to chain saws in order to comply with government standards.

Chain saws operated manually provide good non-splitting cuts, but locating the labor force to handle the saws presents a substantial problem. Using chain saws in mechanical felling heads has presented difficulties due to uncontrolled conditions in felling trees frequently resulting in binding of the chain saw blade within the cut of the tree. In many cases an attempt to back the bound chain out of the saw cut in the tree results in breaking of the chain.

A vehicle supported scissors type felling head which uses a hydraulically actuated chain saw and resisting anvil is disclosed in U.S. Pat. No. 3,612,115 which issued to Albright on Oct. 12, 1971. The chain saw blade, however, is exposed to the solid wood and is subject to binding within the saw cut in the event the tree sways during cutting.

U.S. Pat. No. 3,672,412 which issued to Albright on June 27, 1972 discloses a similar felling head with chain saw. The patentee, however, provides a pusher which operates in conjunction with a chain saw in an attempt to prevent binding of the saw as it cuts through the solid wood of the tree.

A third U.S. Pat. No. 3,796,242 dated Mar. 12, 1974 discloses the combination of a pair of dogleg jaws which clamp the tree being cut at four points so that a chain saw may be swung through the tree without binding in the cut. The patentee also discloses a pair of shear blades on the dogleg jaws for cutting trees of small diameter. A flow divider is used in the system to control the feed rate or swinging of the chain saw through the log inversely with the size of the opening of the jaws.

U.S. Pat. No. 3,726,326 to Coleman which issued on Apr. 10, 1973 discloses a vehicle mounted felling head provided with a first pivoted chain saw which is swung partially through the tree from the side opposite the vehicle. The first chain saw is then pivotally retracted and a reciprocating second chain saw cuts through the uncut portion of the tree while a pusher forces the tree away from the tractor thereby preventing binding.

U.S. Pat. No. 3,854,510 to Matlik which issued on Dec. 17, 1974 discloses a felling head having a pair of pivoted tree supporting jaws with arcuate cross sections. Each jaw has a chain saw incorporated therewith with the tree engaging section of the saw projecting outwardly of the tree supporting jaw in position to precede the jaw through an undisturbed solid portion of the tree. The leading edge and arcuate flutes of each jaw are slightly larger in cross section than the chain saw and are forced into the saw cut to prevent binding of the saw blade as it cuts through the tree.

U.S. Pat. No. 3,902,538 which issued to Muirhead on Sept. 2, 1975 discloses a felling head having a stationary buttress blade and an opposed pivotal blade which carries a sharpened auger-type rotary cutter. As the driven rotary auger is moved with the pivotal blade against a tree, the exposed cutter cuts through the solid wood of the tree toward the buttress blade. During this time clamping means support the tree.

SUMMARY OF THE INVENTION

A method and apparatus for severing a fibrous article, hereinafter referred to as a tree is provided which uses at least one movable shear blade having a pair of spaced shearing edges with a groove therebetween and with a driven fiber removing device disposed within the groove. Relative movement between the shear blade and the tree being cut is of sufficient force to cause the shearing edges to reduce the wood therebetween to relatively loose fibers. The relatively loose, partially broken and crushed fibers are removed by the fiber removing device as the shear blade continues to move through the tree.

The fiber removing device disposed within the shear blade recess may be an endless roller type chain with fiber removing fingers thereon as illustrated in the drawings, may be a standard chain saw, or may even be in the nature of a rotary or reciprocating cutting tool.

BRIEF DESCRIPTION OF THE DRAWINGS

FIG. 1 is a diagrammatic perspective of a felling head in which the preferred embodiment of the tree cutting apparatus of the present invention is incorporated, the shear blades being illustrated in their open position.

FIG. 2 is an enlarged horizontal section generally taken along lines 2—2 of FIG. 1 but with the shear blades being closed.

FIG. 3 is a side elevation with parts broken away, looking in the direction of arrows 3—3 of FIG. 2.

FIG. 4 is a vertical section taken along lines 4—4 of FIG. 2 illustrating one of the shear blades with an endless roller conveyor, fiber removing device therein.

FIG. 5 is an enlarged vertical section taken along lines 5—5 of FIG. 6 of the cutting run of one of the fiber removing devices illustrated within a chain track or groove formed in the leading edge of the shear blade between two parallel shearing edges of the shear blade.

FIG. 6 is a horizontal section taken along lines 6—6 of FIG. 5.

FIG. 7 is an enlarged section taken along lines 7—7 of FIG. 6 diagrammatically illustrating the construction of the roller type fiber removing chain.

FIG. 8 is a section similar to FIG. 5 but illustrating a modified form of the shear with two removable shearing edges and with a standard chain saw blade therein.

FIG. 9 is a diagrammatic plan of a modified form of the invention illustrating a mower type felling operation for small trees.

FIG. 10 is an enlarged plan of the shearing blade and fiber removing chain of FIG. 9, certain parts being broken away.

FIG. 11 is an enlarged vertical section taken along lines 11—11 of FIG. 10 illustrating the chain track and guides for the chain.

DESCRIPTION OF THE PREFERRED EMBODIMENT

The preferred embodiment of the tree cutting method and apparatus 20 (FIGS. 1-7) of the present invention is illustrated in conjunction with a conventional felling head 22 (FIG. 1).

The felling head 22 is supported on a self-propelled, mobile vehicle such as a skidder or harvester, (not shown) for controlled vertical and horizontal pivotal movement. A hydraulically operated articulating boom 24, only an end section 26 being shown in FIG. 1, is provided for supporting the head 22 with the boom section 26 being pivoted about horizontal pivot axis 28 by hydraulic cylinder 30.

The felling head 22 includes an upstanding frame 32 which is pivoted on a transverse horizontal pin 34 that is secured to a pivot shaft 36 normal therewith and journaled in a bearing block 38 secured to the lower end of the boom section 26. A pair of hydraulic cylinders 40 are pivotally connected between the boom section 26 and a pivot arm 42 secured to the pivot shaft 36 for pivoting the head about the shaft 36 to position side plates 43 of the upstanding frame 32 generally parallel to the axis of the tree being felled. A hydraulic cylinder 44 is pivotally connected between the boom section 26 and the upper end of the frame 32 by pins and self aligning connectors. The cylinder 44 is selectively operable to pivot the felling head 22 about pivot pin 34 between a position wherein a front plate 46 of the upstanding frame 32 is substantially parallel to the tree being felled, and a substantially horizontal position so that the felled tree may be bunched or placed in a predetermined location such as in the tongs of a skidder or in a pile on the ground.

During felling, the tree is firmly clamped against a pair of generally V-shaped cradles 48 welded to the frame 32 by a pair of cooperating clamp arms 50. The clamp arms 50 are pivoted to the associated cradles 48 by pivot pins 52 and are selectively opened and closed by hydraulic cylinders 54 (only one being shown) pivotally connected between the cradles 48 and clamp arms 50.

A generally horizontal shear sub-frame 56 is secured as by welding to the lower end of the upstanding frame 32 of the felling head 22. The shear sub-frame 56 includes spaced parallel upper and lower sections 58, 60 connected together by upstanding structural members 62.

A pair of symmetrical shear blade jaws 64, 66 (FIGS. 1 and 2) are pivotally connected to the shear sub-frame 56 by pivot shafts 70, 72 and are pivoted between their open positions (FIG. 1) and closed position (FIG. 2) by hydraulic cylinders 73, 74 pivotally connected between the sub-frame 56 and the associated shear blades 64, 66.

Since the two shear blade jaws 64, 66 of the tree cutting apparatus are substantially the same, only the blade jaw 66 and its fiber removing device 80 will be described in detail.

As illustrated in FIGS. 2-6, the shear blade jaw 66 includes a semi-circular shear blade 82 connected to a flange 83 (FIG. 4) of a blade support 84 by a plurality of capscrews 86. The blade support 84 includes an upper wall 88 and a lower wall 90 interconnected by a vertical inner wall 92 and a vertical outer wall 94. A pair of idler sprockets 96 and 98 (FIGS. 2 and 3) are journaled on the reduced diameter portions 100 (FIG. 3) of associated capscrews 102 and are disposed adjacent opposite ends of the tree contacting portion of the shear blade 82.

An endless chain 104 of the preferred fiber removing device 80 is trained around the idler sprockets 96, 98 and around a drive sprocket 106 secured to the shaft 108 of a hydraulic motor 110 that is bolted to the upper wall 88. Chain tension is maintained by any suitable take-up device 112 (FIG. 2) such as an idler sprocket 114 that is journaled on a lever 116 secured to a pivot shaft 118 that is journaled in and extends upwardly through an upper wall 88. An arm 120 secured to the upper end of a shaft 118 is engaged by an adjustment screw 122 threaded into an ear 124 welded to the upper wall 88.

The fiber removing chain 104 is preferably of the inexpensive roller type as illustrated in FIGS. 5-7. The chain 104 lies in a plane 105 (FIG. 5) and includes a plurality of links 126, 127 interconnected by pivot pins 128 having rollers 130 journaled thereon. Fiber engaging fingers or teeth 132 and 134 are formed on the links, with adjacent teeth being positioned on opposite sides of the chain to provide a fiber raking action. The fiber engaging portions of the teeth are preferably angled inwardly toward the plane 105 of the chain and are preferably long enough to cross that plane 105. The teeth need not be sharpened but preferably have hook-like configurations for engaging and removing the fibers as clearly illustrated in FIG. 6.

An important feature of the invention is that the fiber engaging run of the removing chain 104 is completely recessed between a pair of spaced shear blade projections 136 and 138. The shear blade projections 136, 138 define a chain track or groove 140 therebetween and have sharpened leading edges 142 and 144 defining an elongated open front 145 of the groove and at least one open end 145' (FIG. 1). The leading edges are inwardly beveled at 146, 148. Thus, the chain will never be subjected to binding in the cut being formed in the tree which might otherwise occur if the tree was swaying because of wind or vehicle vibrations or the like. Furthermore, the chain teeth 132, 134 will not contact solid wood but will contact the wood only after the wood has been partially crushed and loosened by penetration of the leading edges 142 and 144 and the inwardly beveled portions of the shear blade in a manner somewhat similar to a mortising chisel but with one additional side of the chisel being removed.

As is well known, such shearing action compresses the wood, breaking it into relatively loose fibers which are much more easily removed from the tree than the solid undisturbed wood. Thus, as the shear progresses through the wood, the fibers forced between the two shear blade projections 136, 138 enter the groove 140 from the open front 145 and are removed through the open side 145' of the groove by the teeth 132 and 134 of the chain 104 which is driven in the direction of the arrows (FIGS. 2 and 6).

The speed of the chain is preferably controlled by a standard hydraulic circuit to vary inversely as the rate of closing of the shear blades; the rate of closing of the shear blades is controlled to be inversely proportional to the chain working load. Since the wood is reduced to fibers, it will be appreciated that less power is required to drive the fiber removing chain 104 than would be required to drive a chain saw cutting solid wood. It will also be appreciated that since the fibers are being removed from between the shear blade projections 136, 138, less power is required to force the shear blades 82 through the tree. Furthermore, the shear blades 82 and the fiber removing chain 104 may be backed out of the cut at any time without danger of binding and breaking the chain since the chain is completely recessed within the groove 140.

A first modified form of the invention is illustrated in FIG. 8, which form is the same as the above described form except that the blade projections 136a and 136b of the blade 82a are made from separate pieces that are secured to a flange 149 by capscrews 150. The flange 149 is further modified to provide a small slot 151 therein to slidably accommodate the tabs 152 of a standard well known chain saw blade 154. This particular form of the invention would be desirable when felling hardwood trees or when felling large trees requiring shear blades 82a that are in excess of about ¾ of an inch in thickness.

It will, of course, be understood that the shear blade 82a may be used with the roller type chain 104 of FIG. 5; or that the shear blade 82 (FIG. 5) may be modified to accept a standard chain saw as illustrated in FIG. 8.

In operation of the preferred embodiment of the tree cutting apparatus 20 (FIG. 1) a vehicle (not shown) moves the felling head 22 into position to engage a standing tree. The hydraulic cylinders 40 and 44 are activated to compensate for ground contour variations upon which the vehicle rests so that the felling head may be vertically aligned with and clamped to the tree by clamp arms 50 that are closed by hydraulic cylinders 54.

Hydraulic cylinders 73 and 74 and hydraulic motors 110 are then activated to cause the shear blade jaws 64, 66 and associated shear blades 82 to move from the FIG. 1 to the FIG. 2 position thereby shearing the tree. As the parallel spaced shear blade projections 136, 138 of each shear blade are forced through the tree, the wood fibers between the blade projections 136, 138 are partially broken and forced inwardly in the groove 140 until they are contacted by the teeth of the fiber removing chain 104 (or 154 FIG. 8). The teeth 132, 134 of the fiber removing chain removes the fibers as the shear blades 82 are progressively forced completely through the tree. Since the fiber removing chains 104 are completely recessed between their associated shear projections 136, 138, there is no danger that the chains will become bound or wedged within the shear cuts due to swaying of the tree or the like.

The felled tree may then be tilted horizontally by actuation of the cylinder 44 (FIG. 1) and then be placed in a pile or in the tongs of a skidder (for example) by proper actuation of the boom 24 by means of hydraulic actuation of cylinders 30 and other cylinders (not shown) all in a manner well known in the art.

A mower type second embodiment of the tree cutting apparatus 20' is diagrammatically illustrated in FIGS. 9-11. In this form of the invention the apparatus 20' is mounted on a vehicle 160 and the movement of the vehicle plus the resistance by the trees 161 being cut provides the requisite severing force to fell the trees.

The cutting apparatus 20' comprises a shear frame 162 that is pivotally connected to the vehicle 160 by pivot pins 164 for pivotal movement between a generally horizontal cutting position and a substantially vertical transport position by a hydraulic cylinder 166.

A linear shear blade 168 is bolted to the forward end of the frame 162 and has its tree contacting edge disposed at substantially 45° to the direction of movement of the vehicle thereby exerting a sliding force to the trees which are of small diameter. The tree contacting edge of the shear blade 168 is formed with a pair of spaced parallel blade projections 170 and 172 (FIG. 11) having inwardly beveled sharpened ends 174, 176 and defining a groove or chain track 178 for receiving a fiber removing chain 180 therein. As indicated in FIG. 11, the chain guiding base 182 of the track 178 is angled to permit the path of movement of the chain to be rearwardly and upwardly inclined thus providing no structure lower than the shear blade which might hang up on the stumps of previously cut trees. Although the roller type chain is illustrated in FIG. 11, it will be understood that the track may be modified so that a standard chain saw may also be used. As in the first embodiment of the invention, the fiber removing chain 180 is driven by a drive sprocket 186 of a hydraulic motor 188 which advances the chain through suitable guide tracks 190 in the frame 162.

In operation, the vehicle 160 is slowly driven forward causing the sharpened end 174 and 176 of the parallel blade projections to cut into the tree and break the wood into fibers, which fibers are removed by the fiber removing chain 180 as they enter the groove 178 and until the tree is completely severed.

Although the preferred embodiment of the invention has been described in connection with the felling of trees, it will be understood that the invention is not limited to felling trees. The tree cutting apparatus may be used to sever any fibrous type of material, and the shear may be of the single or double pivoted jaw type or may be of the guillotine type. Also, the fiber removing device is not limited to an endless chain, but it is within the scope of the invention to provide rotary or reciprocating devices for certain fiber removing operations.

From the foregoing description it is apparent that the tree cutting apparatus of the present invention includes at least one shear blade having a pair of spaced shearing projections with a fiber receiving groove therebetween. A fiber removing device, such as a driven endless chain, is completely recessed between the shear projections to avoid binding as the shear moves through the wood and to remove the partially crushed and broken fibers as they are forced into the groove by actuation of the shear projections.

Although the best mode contemplated for carrying out the present invention has been herein shown and described, it will be apparent that modification and variation may be made without departing from what is regarded to be the subject matter of the invention.

What I claim is:

1. An apparatus for severing a fibrous article such as a tree comprising, means defining a shear blade having a pair of spaced shear blade projections on its forward end and defining a groove therebetween having an open front and at least one open side through which fibers are removed, power means forcing said shear blade projection means into said article to penetrate and shear the article forcing broken and crushed fibers into said groove, and a driven fiber removing device having its fiber removing portion completely recessed in said groove for removing the crushed fibers from the groove as the shear progresses into the article.

2. An apparatus according to claim 1 wherein said forward ends of said shear blade projections are sharpened and are angled inwardly of the groove to further break the fibers as they enter the groove.

3. An apparatus according to claim 1 and additionally comprising abutment means on the opposite side of the fibrous article from said shear blade to preclude movement of the article away from said shear blade projections when said projections are being forced into the fibrous article.

4. An apparatus according to claim 3 wherein said abutment means is a second shear blade having a second pair of spaced shear blade projections on its forward end and defining a second groove therebetween, and a second driven fiber removing device having its fiber removing portion completely recessed in said second groove to remove fibers therefrom.

5. An apparatus according to claim 4 and additionally comprising second power means for moving said second shear blade into the article to penetrate and shear through a portion of the article.

6. An apparatus according to claim 5 wherein said first and second shear blades are pivotally mounted, and wherein said first and second power means are hydraulic cylinders that are selectively controlled to move the shear blades toward each other to shear the article and thereafter to move away from each other.

7. An apparatus according to claim 1 wherein said fiber removing device is an endless chain having fiber engaging teeth thereon which are entirely confined within said groove when pulling fibers out of said groove.

8. An apparatus according to claim 7 wherein said endless chain is a roller conveyor having hook shaped teeth thereon.

9. An apparatus according to claim 7 wherein said endless chain is an endless chain saw blade.

10. An apparatus according to claim 6 wherein said fiber removing device is an endless chain having fiber engaging teeth thereon which are entirely confined within said groove when pulling fibers out of said groove.

11. An apparatus according to claim 6 wherein said endless chain is a roller conveyor having hook shaped teeth thereon.

12. An apparatus according to claim 6 wherein said endless chain is an endless chain saw blade.

13. A tree felling head comprising means for clamping the head to a tree to be felled, means defining at least one shear blade on said head, said shear blade having a pair of spaced shear blade projections on its forward end and defining a groove therebetween, power means on said head for forcing said shear blade through at least a portion of said tree directing broken and crushed fibers into said groove, abutment means on said head for precluding movement of the tree away from said shear blade projections when the projections are being forced into the tree, and a driven fiber removing device for removing wood fibers from said groove, the entire portion of said fiber removing device that is positioned within said groove lying between said shear blade projections and rearward of said forward ends to prevent the fiber removing device from being exposed to binding forces induced by partial closing of the cut being formed in the tree.

14. An apparatus according to claim 13 wherein said fiber removing device is a driven endless chain having teeth thereon.

15. An apparatus according to claim 14 wherein said endless chain is a roller type chain with hook shaped teeth thereon.

16. An apparatus according to claim 13 wherein said abutment means is a second shear blade having a second pair of spaced shear blade projections on its forward end and defining a second groove therebetween, second power means for driving said second shear blade partially through said tree, and a second driven fiber removing device for removing wood fibers from the slot with all portions thereof that are in said second groove being recessed behind the forward ends of said second shear blade projections.

17. An apparatus according to claim 16 wherein said second fiber removing device is an endless chain having teeth thereon.

18. A tree felling machine comprising a self-propelled mobile vehicle movable along a path adjacent trees to be felled, a cutting frame pivoted to one side of said vehicle for pivotal movement between a generally horizontal cutting position and an upright transport position, a shear blade on the forward end of said frame angled outwardly and rearwardly of the direction of movement of the vehicle for engaging trees to be felled in response to movement of the vehicle along said path, said shear blade having a pair of spaced shear blade projections on its forward end and defining a groove therebetween, and a driven fiber removing device for removing wood fibers from said groove, the entire portion of said fiber removing device that is positioned in said groove lying between said shear blade projection and rearwardly of said forward end to prevent the fiber removing device from being exposed to binding forces induced by partial closing of the cut through the tree.

19. An apparatus according to claim 18 wherein said fiber removing device is a driven endless chain having teeth thereon.

20. An apparatus according to claim 19 wherein said endless chain is a roller type chain with hook shaped teeth thereon.

21. An apparatus according to claim 19 wherein said endless chain is the chain of a chain saw.

22. A method of severing a fibrous article comprising the steps of applying transverse shearing forces to the article in one direction along two shear lines spaced a predetermined distance apart for reducing the material between said shear lines into partially broken loose fibers, said partially broken loose fibers extending the full width of the contacted portion of the article including loose fibers at the sides thereof, engaging the loose fibers rearwardly of said shear lines for removing the loose fibers from one side thereof, and continuing the application of the shearing force along said two shear lines and the removal of loose fibers rearwardly of said shear lines until the article has been severed a desired distance.

23. A method of severing a fibrous article with a shear blade having a pair of spaced shear blade projections defining a groove having an open front and at least one open end, and a fiber removing device recessed within said groove for preventing binding of the device in the cut formed in the article, comprising; the steps of moving the shear blade projection into said material to shear the contacted material causing partially broken and crushed fibers to enter the groove, and driving the fiber removing device for progressively removing the fibers from the groove as the shear progresses into the material for preventing binding of the fiber removing device in the cut.

24. A method according to claim 23 wherein the partially broken and crushed fibers are removed from one end of said groove.

25. A method according to claim 24 wherein the partially broken and crushed fibers are being removed from said one end by substantially engaging said fibers at spaced points throughout substantially the entire length of said groove and progressively pulling the fibers out said one end.

26. A method according to claim 24 wherein the fibers are pulled out of said one end by linear movement of said fiber removing device.

27. A method according to claim 26 wherein the fibers are engaged throughout the length of the slot alternately on opposite sides of the transverse centerline of the slot.

* * * * *